Sheet 1. 4 Sheets.

E. B. Bigelow.
Weaving Pile Fabric.

No. 150.

Reissued Nov. 20, 1849.

E. B. Bigelow.
Weaving Pile Fabric.

No. 150.

Reissued Nov. 20, 1849.

E. B. Bigelow.
Weaving Pile Fabric.
Sheet 3 - 4 Sheets.
No. 150.
Reissued Nov. 20, 1849.
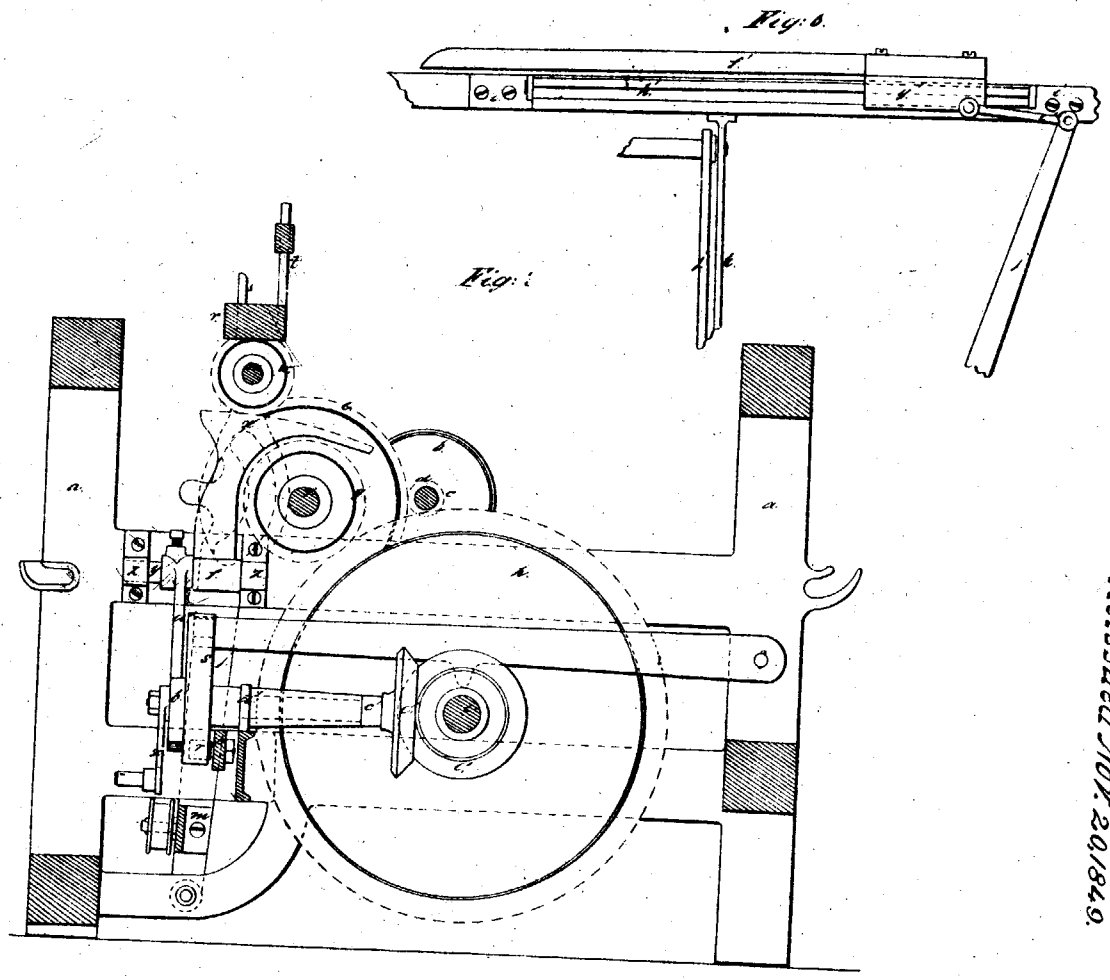

Sheet 4. 4 Sheets.

E. B. Bigelow.
Weaving Pile Fabric.

No. 150.

Reissued Nov. 20, 1849.

UNITED STATES PATENT OFFICE.

ERASTUS B. BIGELOW, OF CLINTONVILLE, MASSACHUSETTS.

IMPROVEMENT IN LOOMS FOR WEAVING BRUSSELS CARPETING, &c.

Specification forming part of Letters Patent No. 6,186, dated March 13, 1849; Reissue No. 150, dated November 20, 1849.

*To all whom it may concern:*

Be it known that I, ERASTUS B. BIGELOW, of Clintonville, in the county of Worcester and Commonwealth of Massachusetts, have invented new and useful Improvements in Power-Looms for Weaving Brussels Carpets and other Similarly-Wrought Fabrics, of which the following is a full and exact description, reference being had to the accompanying drawings, which form a part of my specification.

In weaving Brussels carpets it is sometimes necessary to clear the shed of the warps preparatory to introducing the pile-wires, and also to beat up some threads of the filling more closely than others when first introduced to bring up a full pile upon the cloth.

My improvements consist in giving to the lathe of the loom a counter motion, whereby the reed may be made to approach nearer the face of the cloth at some of its beats than at others, for the purpose of properly laying the filing to form the pile of the cloth and carrying the trough or grooved bar employed to carry the wires between the warps (or the equivalent thereof) forward to clear the shed before it is withdrawn therefrom.

Not deeming it necessary to describe all the parts essential to a complete Brussels-carpet loom, I shall limit my specification to those parts which are requisite to explain my improvements.

Figure 1:
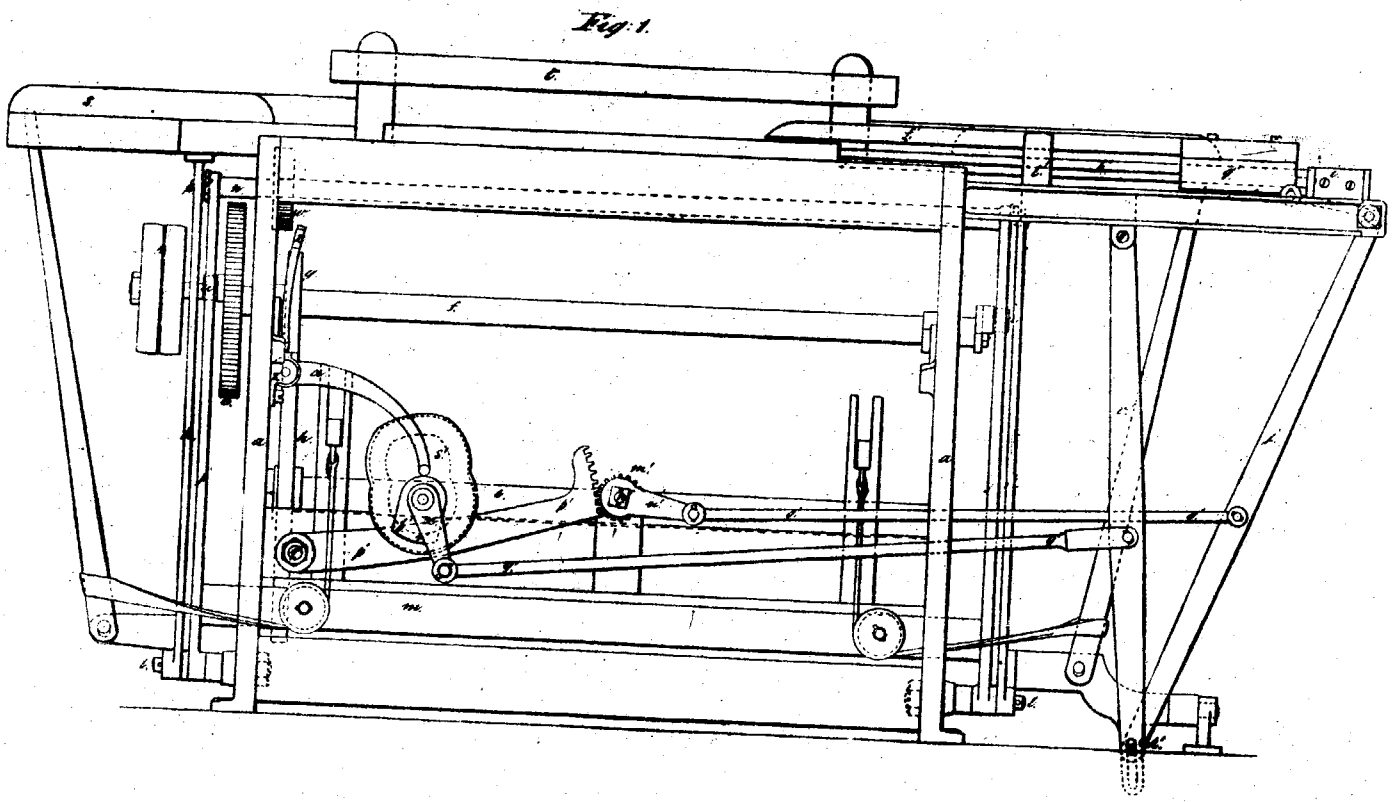
Figure 5:
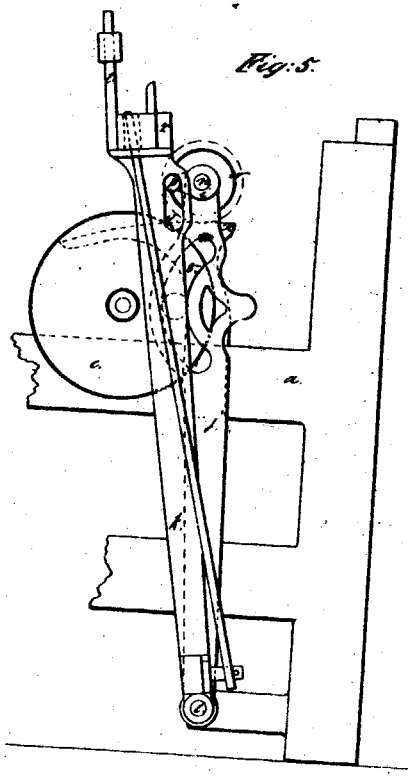
Figure 4:
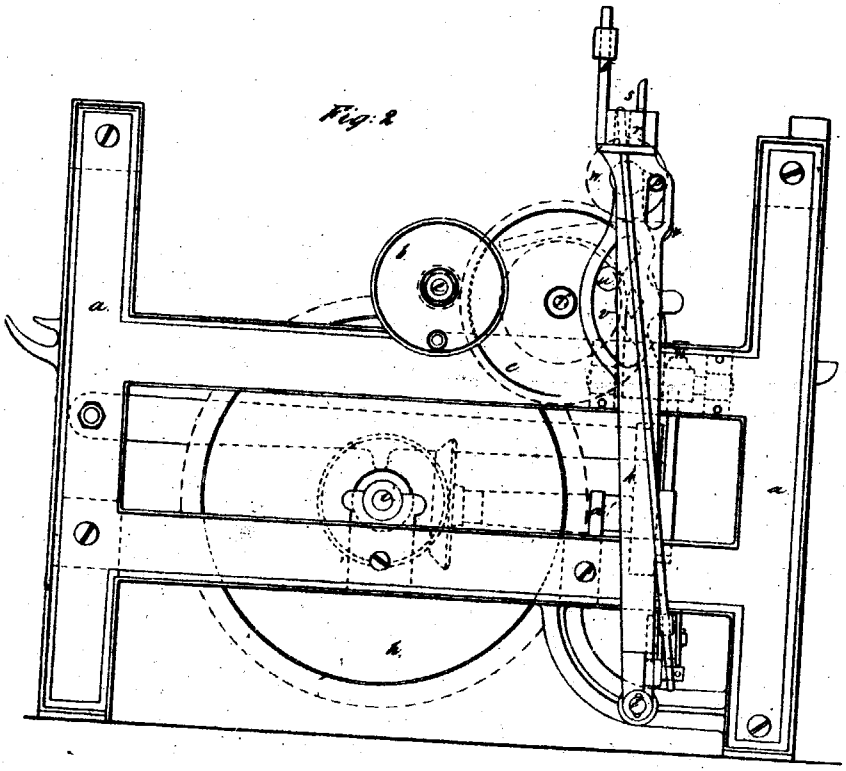
Figure 4:
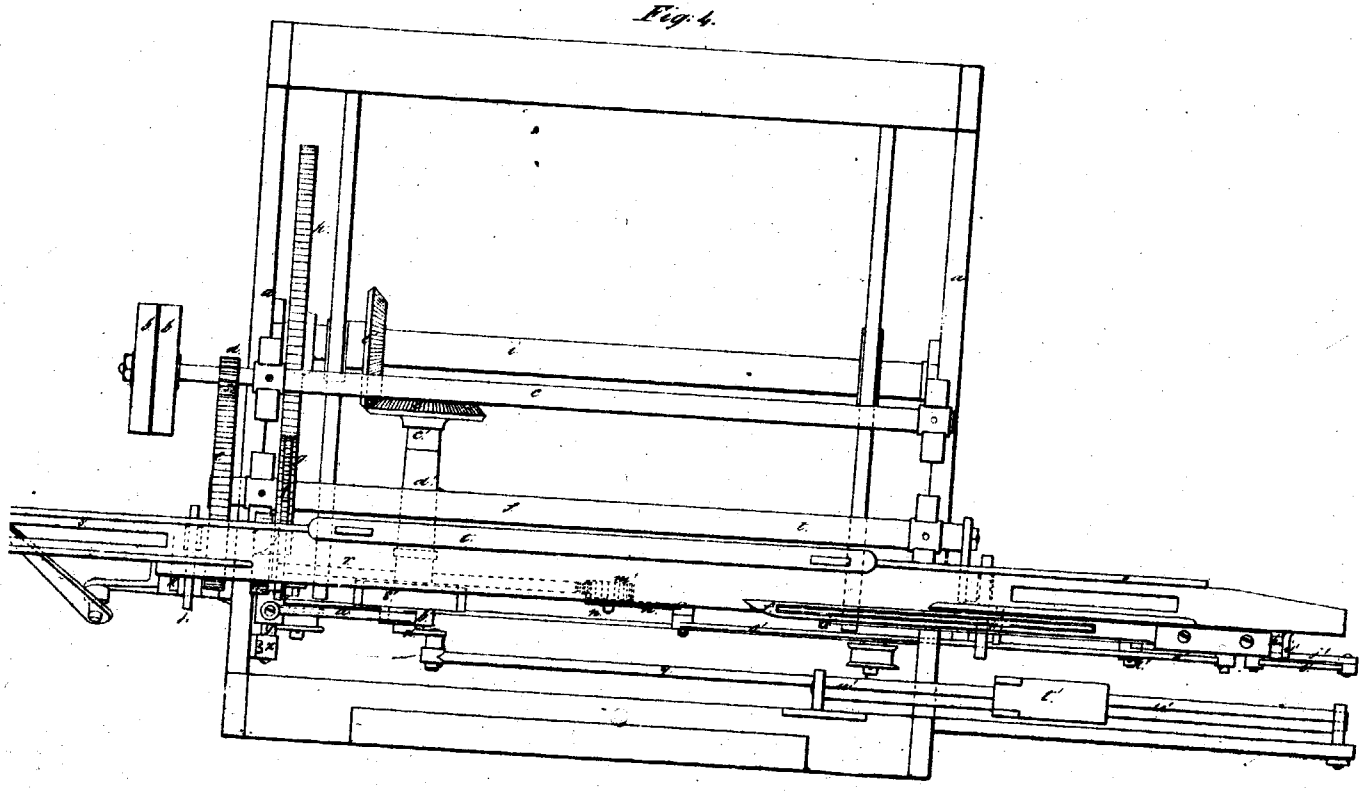

Figure 1 is a front view of the loom; Fig. 2, an end view, and Fig. 3 a section showing the inside view of the loom when looking toward the left end. Fig. 4 is a plan, and Figs. 5 and 6 are views of parts in detail.

In plates I and II, *a a a a* represent the frame of the loom, and *b b* the driving-pulleys which operate the shaft *c*. The pinion *d* engages with the cogged wheel *e* and turns the lathe-shaft *f*. The cogged wheel *g* (see Fig. 3) engages with the cogged wheel *h* and turns the cam-shaft *i*, which imparts motion to many of the principal parts of the loom. The respective sizes of the cogged wheels *g* and *h* are in the ratio of one of the former to four of the latter.

To give the counter motion to the lathe two pairs of swords are employed—viz., the main swords *j j* and the auxiliary swords *k k*—which vibrate on their respective studs *l l*. The main swords *j j* are connected together near their lower ends by the girth *m*. *n* is a rotating shaft, which is formed with shoulders to receive the upper ends of the main swords *j j*. *o o* are crank-arms or eccentrics, which are secured to the shaft *n*, in such a manner as to prevent the main swords *j j* from receding from each other, thus giving to the shaft *n* somewhat the office of a connecting-girth.

The crank-rollers *p p* are attached to the crank-arms *o o* and work in the slots *q q*, in the auxiliary swords *k k*. The race-beam *r* is affixed to the upper ends of the auxiliary swords *k k*, and is constructed with the shuttle-boxes *s s* and the reed-frame *t* in the ordinary way.

The lathe-shaft *f* imparts a continual vibratory motion to the main swords *j j* through the action of the crank-rollers *u u*, working in the circular slots *v v*. Now, while the shaft *n* remains at rest with its crank-arms or eccentrics *o o* in the position seen in Fig. 2, the race-beam *r* moves with the main swords *j j* in the same manner as though it were securely affixed to it; but when the counter motion before mentioned is required the shaft *n* is made to turn during the advance motion of the main swords *j j* to the position seen in Fig. 5, thus causing the race-beam and trough or grooved bar to remain back in the required position. Then, as the main swords *j j* move backward, the shaft *n* returns to its former position, as seen in Fig. 2, where it remains until another wire is introduced.

The shaft *n* is made to turn at the required time in the following manner: Affixed to the shaft *n* is the cogged wheel *w*, the circumference of which is equal to the space passed over by the motion of the main swords of the lathe *j j* at the pitch-line on the lower side of the wheel. *x* represents a segment of gear attached to the shaft *y*, which turns in the stands *z z*. The ends of the teeth of the cogged wheel *w* and of the segment *x* which present together are wedge-shaped, to enable them readily to engage with each other. *a′* is an arm, one end of which is attached to the shaft *y*, and the other extends down to the cam *b′* on the shaft *c′*. The shaft *c′* turns in the stand *d′*, and is actuated by the cam-shaft *i* through the action of the miter-gears *e′ e′*.

While the lathe is back in a comparative state of rest—that is to say, while the rollers $u$ $u$ are moving through the circular slots $v$ $v$—the cam $b'$ raises the arm $a'$ and engages the segment $x$ with the cogged wheel $w$. When the main swords $j$ $j$ move forward to the extent of their motion, the shaft $n$ by the action of the segment $x$ performs half a revolution. Then, as the main swords $j$ $j$ move back again, the shaft $n$ is turned to its former position, and the cam $b'$ disengages the segment $x$ from the cogged wheel $w$, which allows the whole of the lathe to move together, as before.

By varying the length of the crank-arms or eccentrics $o$ $o$, or by varying the degree of motion given to the shaft $n$, the regular advance motion of the lathe may be diminished to any extent required at any given beat of the lathe, for the purposes aforesaid.

To effect the operation of cleaning the shed, I cause the trough or grooved bar employed to carry the wires under the figuring-warps to remain under said warps during the next successive beat of the lathe after it has entered to introduce a wire, so that it shall be carried forward to separate the upper from the lower portion of the warp, the extent of its advance motion being limited in the manner above described.

The trough or grooved bar for introducing the wires is operated as follows. A top view of this trough or bar is seen at $f'$ in Fig. 4, and a side view in Fig. 6. The trough $f'$ is affixed to the sliding box $g'$, which clasps and traverses the angular bar $h'$. The bar $h'$ is supported by the stands $i'$ $i'$, which are secured to the race-beam $r$. $j'$ is an upright lever, which vibrates on a stud, $k'$, at its lower end, and is connected by the bar $l'$ at its upper end to the sliding box $g'$. $m'$ is a cogged wheel, which turns on the stud $n'$, and has a crank, $n''$, affixed to it. $o'$ is a bar, which connects the crank $n''$ with the lever $j'$. $p'$ is a lever, which vibrates at one end on the stud $q'$, and has the segment of a gear on the opposite end, which engages with the cogged wheel $m'$. The lever $p'$ has a stud projecting from its side, carrying the roller $r'$, which is represented by the dotted lines in Fig. 1. Affixed to shaft $c'$ is a double cam, $s'$, whose acting surfaces are represented by dotted lines and act upon the roller $r'$. Now, to cause the trough or grooved bar $f'$ to enter to the warps to carry in a wire and clear the shed, the cam $s'$ forces down the lever $p'$ and turns the crank $n''$, which takes said trough or grooved bar $f'$ forward to the position seen in Fig. 4. After said trough or grooved bar has been moved toward the face of the cloth to clear the shed, as above described, and has discharged its wire, the cam $s'$ raises the lever $p'$, and turns the crank $n''$ back, which takes the parts connected with it to the position seen in Fig. 1.

The wires may be drawn from the cloth and transferred from the pinchers to the trough or grooved bar in the same manner as described in my Letters Patent for new and useful improvements in machinery for weaving Brussels carpets, dated March 20, 1847. I will, however, describe the manner in which I move the pinchers for drawing the wires in connection with the above-described parts.

$t'$ represents the pincher-stand, which is so formed as to grasp and to traverse the angular bar $u'$. $v'$ is a lever, the upper end of which is jointed to the under side of the pincher-stand $t'$, and the lower end works upon a stud, $w'$. $x$ is a crank attached to the shaft $c'$, and is connected with the lever $v'$ by the bar $y'$. The shaft $c'$ performs one revolution every wire to be drawn, thus giving the pinchers the proper reciprocating motion.

Having fully described my improvements in the foregoing specification, what I claim as new, and desire to secure by Letters Patent, is—

1. Giving to the lathe of the power-loom a counter motion to vary the extent of its approach toward the face of the cloth at any required beat, to properly lay the filling to form the pile of the cloth, or clear the shed, as above specified.

2. Moving the trough or grooved bar which is employed to carry the pile-wires under the warps, or the equivalent thereof, forward toward the face of the cloth to clear the shed, as above described, or in any other way which shall accomplish the same end by substantially the same means.

E. B. BIGELOW.

Witnesses:
CHS. G. STEVENS,
JAMES STEWART.